United States Patent [19]

Hollingsworth

[11] Patent Number: 5,217,119
[45] Date of Patent: Jun. 8, 1993

[54] CARRYING CASE FOR LAPTOP COMPUTER

[76] Inventor: Dale Hollingsworth, 742 Ridgefield Rd., Wilton, Conn. 06897

[21] Appl. No.: 894,381

[22] Filed: Jun. 4, 1992

[51] Int. Cl.$^5$ .................. B65D 81/02; B65D 85/00; A45C 3/02
[52] U.S. Cl. ................... 206/583; 206/320; 190/102; 190/103; 190/127; 190/111; 190/115; 190/902
[58] Field of Search .............. 190/102, 103, 127, 111, 190/115, 902; 206/583, 806, 320

[56] References Cited

U.S. PATENT DOCUMENTS

| | | | |
|---|---|---|---|
| 3,853,220 | 12/1974 | Luray | 206/583 X |
| 4,013,170 | 3/1977 | Hutterer | 206/583 X |
| 4,837,590 | 6/1989 | Sprague | 206/320 X |
| 4,919,240 | 4/1990 | Tobias | 190/103 |
| 5,010,988 | 4/1991 | Brown | 206/320 X |
| 5,105,920 | 4/1992 | Grebenstein | 190/111 X |
| 5,160,001 | 11/1992 | Marceau | 190/102 |

Primary Examiner—William I. Price

[57] ABSTRACT

An improved carrying case for a laptop computer or other delicate electronic instrument is generally rectangular, having front and rear walls. A suspension system for the laptop computer or other equipment includes a cradle suspended from the front and rear walls for receiving a laptop computer, and elastic panel members supporting the cradle for absorbing shocks and impacts occurring upon placing of the case on a floor or the like.

24 Claims, 3 Drawing Sheets

CARRYING CASE FOR LAPTOP COMPUTER

BACKGROUND OF THE INVENTION

1. Field of the Invention

This invention relates to a carrying case for a laptop computer or other delicate electronic instrument. More particularly, this invention relates to a carrying case providing very secure carriage of a delicate laptop computer as well as convenient storage for floppy disks, peripherals and other equipment, while not being excessively bulky or heavy.

2. Description of the Prior Art

Recent years have seen a proliferation of so-called "laptop" computers, that is, personal computers so reduced in size and weight as to be conveniently carried and employed while traveling or the like. The art has not provided a suitable carrying case for such laptop computers. A suitable carrying case for a laptop computer would provide substantial protection against: impact and shock, as might commonly occur if the computer in its case were dropped on the floor from a typical carrying height; impacts against sharp corners of furniture or the like; and damage due to rough handling by the owner, e.g., placing the case on a baggage rack or the like. Such a carrying case for a laptop computer would also desirably include a number of small pockets, compartments or the like for storing floppy disks, printouts and other documents such as owner's manuals, as well as other equipment such as modems, portable printers, connecting cables and the like. Similar considerations apply to the provision of suitable carrying cases for other sorts of electronic equipment and associated items, such as portable compact disc players and the associated discs, or video cameras and associated microphones, tapes and the like. Such a case should also not be excessively costly, heavy, or bulky. Further, it would be desirable that such a case provide a neat and professional appearance whether relatively full, that is, having each of its compartments full of equipment or the like, or relatively empty.

OBJECTS AND SUMMARY OF THE INVENTION

Accordingly, it is an object of the invention to provide an improved carrying case for a laptop computer or other delicate electronic instrument protecting the equipment from substantial shock, impact, and the like, while also providing convenient storage for documents and various other items, but without incurring excessive penalties as to weight, cost, or bulk.

These and other objects of the invention which will be apparent from the discussion below are satisfied by the carrying case according to the present invention wherein a carrying case for a laptop computer or the like comprises a bottom, front and rear walls, left and right side walls, and a top. The top is hinged to the rear wall and has a flap depending over the front wall. A latch secures the flap to the front wall, thus securely closing a principal compartment for receiving a laptop computer or other electronic equipment. A suspension system for supporting the laptop computer is mounted within the principal compartment. The suspension system comprises a U-shaped padded fabric cradle section connected on either side to the upper inner surfaces of the front and rear walls by elastic panels. The elastic of the panels is such that the lowermost surface of a typical laptop computer is supported well above the inner floor of the bottom of the carrying case under normal circumstances. Accordingly, if the carrying case is dropped onto its bottom surface, as might occur upon its being set down hurriedly, the elastic allows the laptop computer to slowly decelerate to a stop, rather than violently impacting the floor of the carrying case; that is, the elastic panels stretch to absorb the kinetic energy of the falling laptop computer.

The front and rear walls of the carrying case according to the invention comprise padded stiffener members. The stiffener members give the case its basic shape, support the suspension system, ensure that the case sits upright on its bottom whether laden or empty, and provide protection to the laptop computer against sidewise impacts, punctures or the like. Additional auxiliary compartments may be provided for convenient storage and carrying of various items.

BRIEF DESCRIPTION OF THE DRAWINGS

The invention will be better understood if reference is made to the accompanying drawings, wherein like reference numerals in the various figures are employed to designate like components, and wherein:

FIG. 4 is a rear perspective three-quarter view of the carrying case of the invention, again showing several of the compartments of the case open.

DESCRIPTION OF THE PREFERRED EMBODIMENTS

Figure 1:
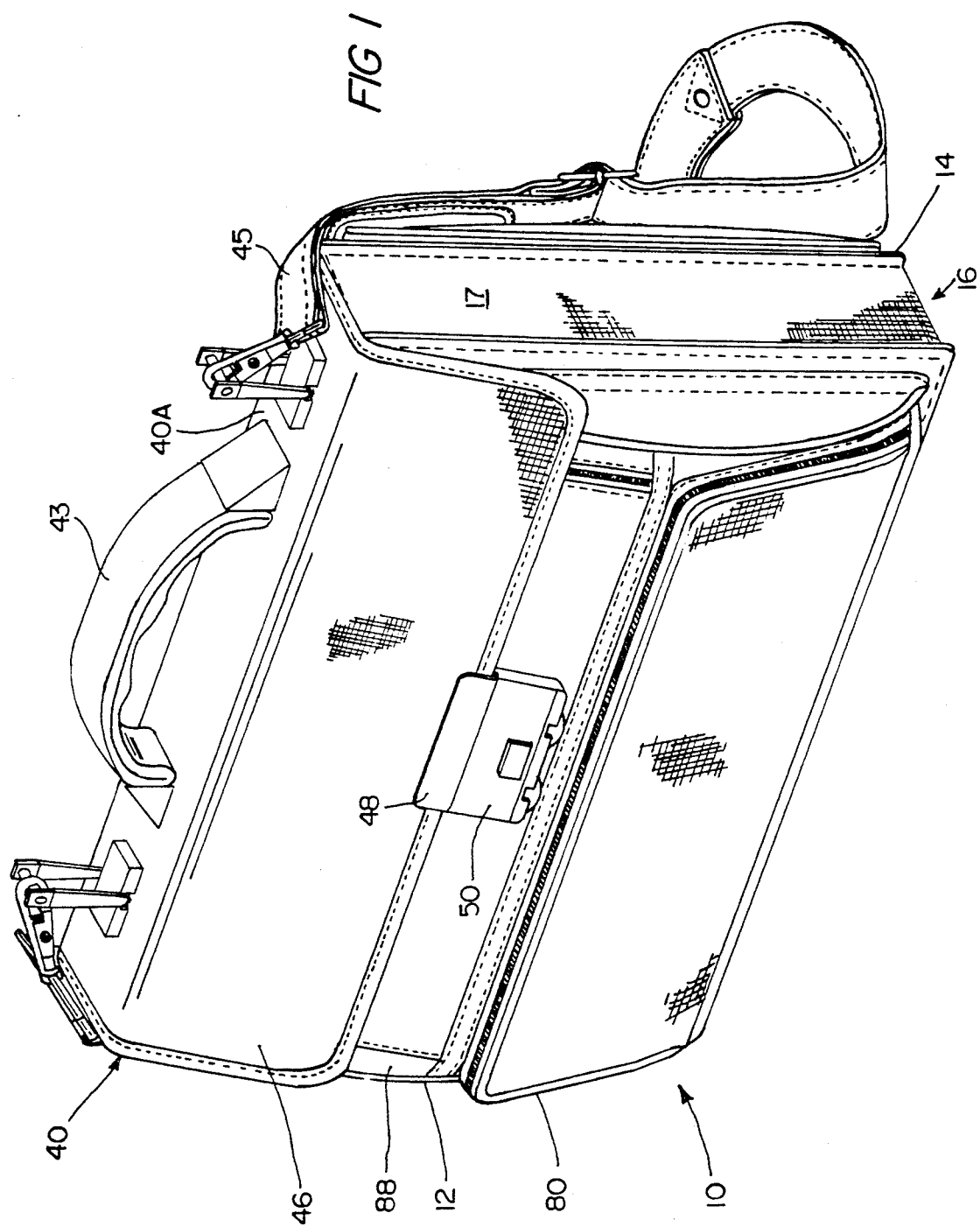
FIG. 1 is a perspective view of the carrying case of the invention from its front right three-quarter view, with the compartments of the case closed.

Referring to FIGS. 1-5 in greater detail, the carrying case 10 according to the invention includes a front wall 12, a rear wall 14, a bottom surface 16, left and right side walls 15 and 17 respectively, and a top 40. Front and rear walls 12 and 14, left and right walls 15 and 17, bottom 16, and top 40 together define a principal compartment 22 for receiving a laptop computer 26, shown in phantom in FIG. 3, or another delicate electronic device.

Figure 3:
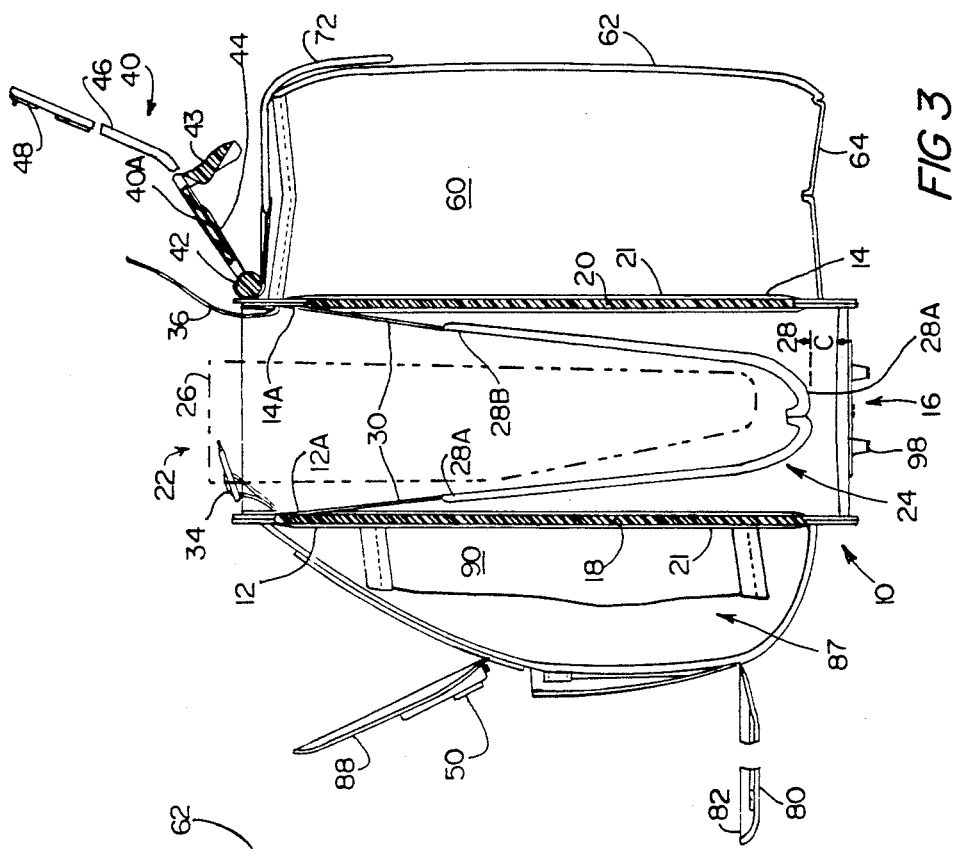
FIG. 3 is a view in section taken along lines 3—3 of FIG. 2.

As more particularly shown in the cross-sectional view of FIG. 3, front and rear walls 12 and 14 include impact-resistant stiffening panels 18 and 20, respectively. Stiffeners 18 and 20 ensure that the carrying case 10 retains its shape and provide support for a suspension system 24 for a laptop computer 26, as discussed below. Stiffeners 18 and 20 may be formed of relatively stiff, tough plastic such as "ABS", may be padded, and are preferably encased by the case fabric material as indicated generally at 21. Such fabric material forms the principal visible surfaces of the carrying case 10 of the invention.

A suspension system 24 for a laptop computer 26 (or other electronic equipment) depends from the upper portions 12a and 14a of the inner surfaces of front and rear walls 12 and 14, respectively. The suspension system 24 comprises a U-shaped cradle 28, typically a relatively flexible member formed of padded cloth, and two panels 30 of resilient material, preferably a knitted fabric comprising elastic fibers or strands. That is, the elastic panels are of suitable rubberized fabric material as used throughout the garment and luggage industries. Elastic panels 30 are sewn or otherwise joined to cradle 28 at upper edges 28a and 28b thereof. Elastic panels 30 are then adhesively bonded and/or stitched or otherwise joined to upper portions 12a and 14a of inner surfaces of the front and rear walls of carrying case 10 of the invention.

The tensile characteristics and the dimensions of elastic panels 30 are chosen so that the lowermost surface or edge of a typical laptop computer 26 disposed in cradle 28 is normally space above the inner surface of the bottom 16 of case 10. That is, elastic panels 30 are chosen such that the weight of a typical laptop computer 26 disposed in cradle 28 is insufficient to stretch elastic panels 30 to the point that the lower surface 28a of the cradle contacts the inner floor surface of bottom 16 of carrying case 10 under normal circumstances. Preferably a clearance C of at least about one inch remains when a laptop computer 26 of typical weight is placed in cradle 28. In this way, if carrying case 10 with laptop computer 26 therein is set down roughly, as might typically occur during travel, elastic panels 30 are capable of stretching to absorb the shock and impact otherwise experienced by the laptop computer. That is, when the carrying case according to the invention is set down rapidly, its motion is brought abruptly to a stop when its bottom surface 16 meets a flat floor or the like. If the laptop computer were similarly abruptly stopped, sudden dissipation of its kinetic energy might cause damage to its disc drives and other delicate components. By instead supporting the laptop computer 26 on a suspension member 24 including resilient elastic panels 30, with a space provided between the suspension member and the floor of compartment 22, the elastic panels can stretch as needed to absorb the kinetic energy of the laptop computer 26, thereby cushioning it, and absorbing any shock which would otherwise occur due to the carrying case being abruptly set down.

The weight of laptop computer 26 in its cradle 28 is borne by front and rear walls 12 and 14. In order that walls 12 and 14 may withstand the loads occurring when the case is set down, in the preferred embodiment they are strengthened by stiffening panels 18 and 20. Stiffening panels 18 and 20 in the front and rear walls 12 and 14 further protect laptop computer 26 against localized impacts from the corners of furniture, sharp instruments, or the like.

A pair of mating strap members 34 and 36 secure the laptop computer 26 within suspension member 24.

Figure 2:
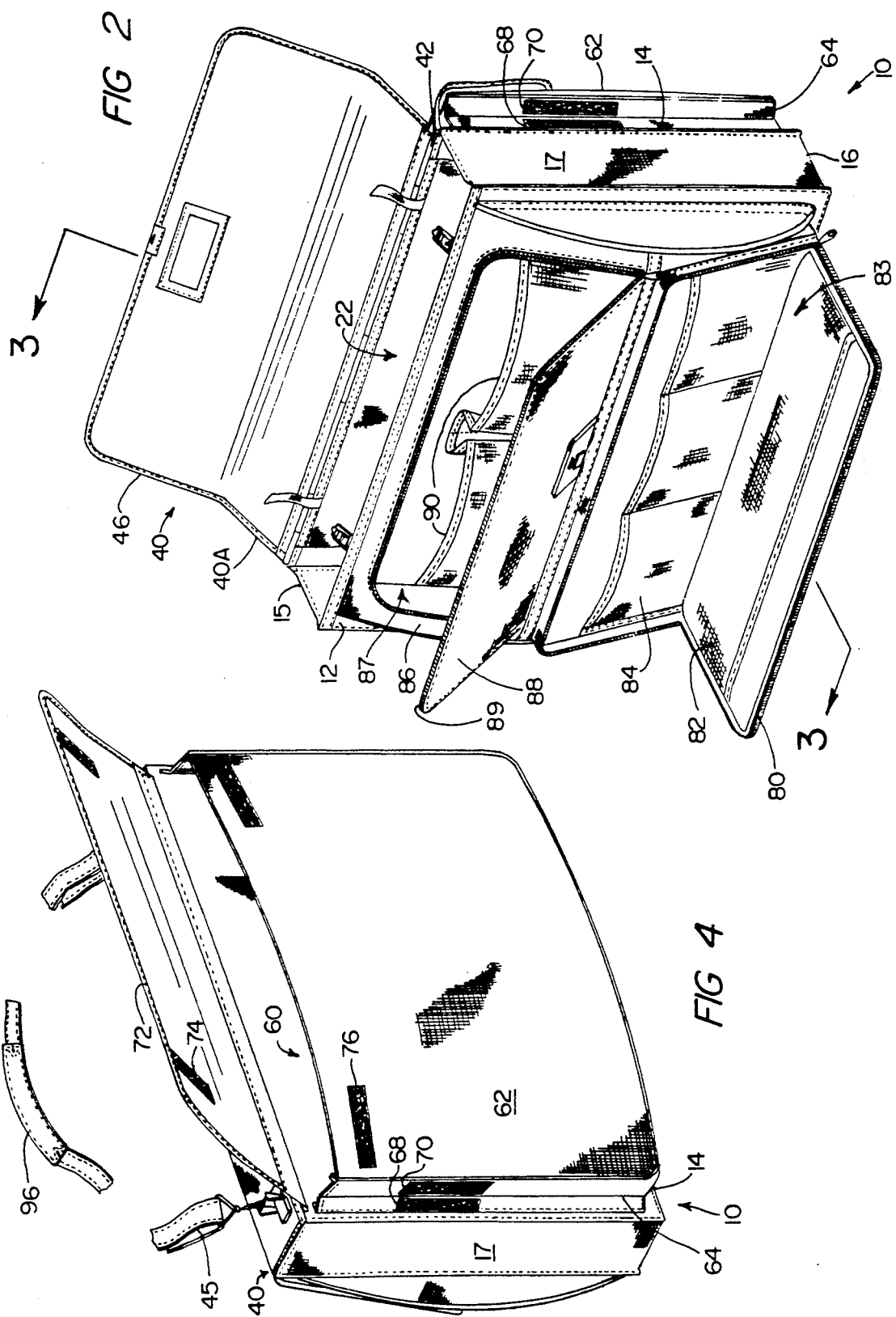
FIG. 2 is a view comparable to that of FIG. 1, but with several of the compartments of the carrying case of the invention open.

As shown in FIGS. 1, 2 and 3, the principal compartment 22 of the carrying case according to the invention is completed by end walls 15 and 17 and by a top 40. Preferably top 40 is hinged by a rigid hinge 42 to the upper edge of rear wall 14. When top 40 is closed, a horizontal portion 40a of top 40 extends between the front and rear walls. Portion 40a is reinforced as indicated generally at 44, providing a secure mounting structure for handle 43 and shoulder strap 45. Top 40 further comprises a flap portion 46, depending downwardly over the front wall 12 of the case in the closed position shown in FIG. 1. Mating latch members 48 and 50 on the flap 46 and the front of case 10 respectively secure top 40 closed.

As discussed above, it is an object of the invention to provide a carrying case for a laptop computer also providing convenient storage for papers, manuals and other useful peripherals such as modems, portable printers and the like. To this end, a large auxiliary compartment 60 is formed by a panel 62 attached to the rear wall 14 of carrying case 10 by means of a creased band 64 of fabric extending around the sides and bottom of the auxiliary compartment 60. In order that panel 62 can be retained neatly and compactly against back wall 14 of the carrying case while not being used, opposed strips of cooperating hook and loop material 68 and 70 are provided on opposed faces of the creased band of fabric. When compartment 60 is substantially empty, cooperating hook and loop strips 68 and 70 may be employed to secure panel 62 against rear wall 14 in a neat and compact arrangement.

The top of rear compartment 60 is closed by a flap 72 secured to panel 62 by further strips 74 and 76 of hook and loop material. As shown in FIG. 4, cooperating strips 74 on flap 72 and strips 76 on panel 62 may be arranged orthogonal to one another so as to render their relative alignment less critical.

Additional compartments may be formed on the front panel of the carrying case of the invention; for example, a large compartment 87 may be formed by a panel 86 on front wall 12 of case 10. Access to compartment 87 may be by way of a flap 88 closed by a zipper 89. Mesh pockets 90 may be provided in compartment 87 for the convenient storage of various and sundry items. A lower compartment 83 may be defined by a further flap 80 on the lower portion of panel 86. Compartment 83 may include a number of pockets 82 and 84 of various sizes formed by sewing mesh material to the surfaces of panel 86 and flap 80 within compartment 83.

As mentioned, a handle 43 and a shoulder strap 45 may both be secured to reinforced section 40a of top 40. Preferably, as shown in FIG. 4, a shoulder-engaging member 96 is provided between the ends of the shoulder strap 45. Member 96 may be of generally arcuate configuration when lying in the same plane as the strap 94, ensuring that member 96 will conform to the user's shoulder for convenient carrying of case 10. Member 96 may have a surface of a wear-resistant suede-like anti-slip material.

Figure 5:
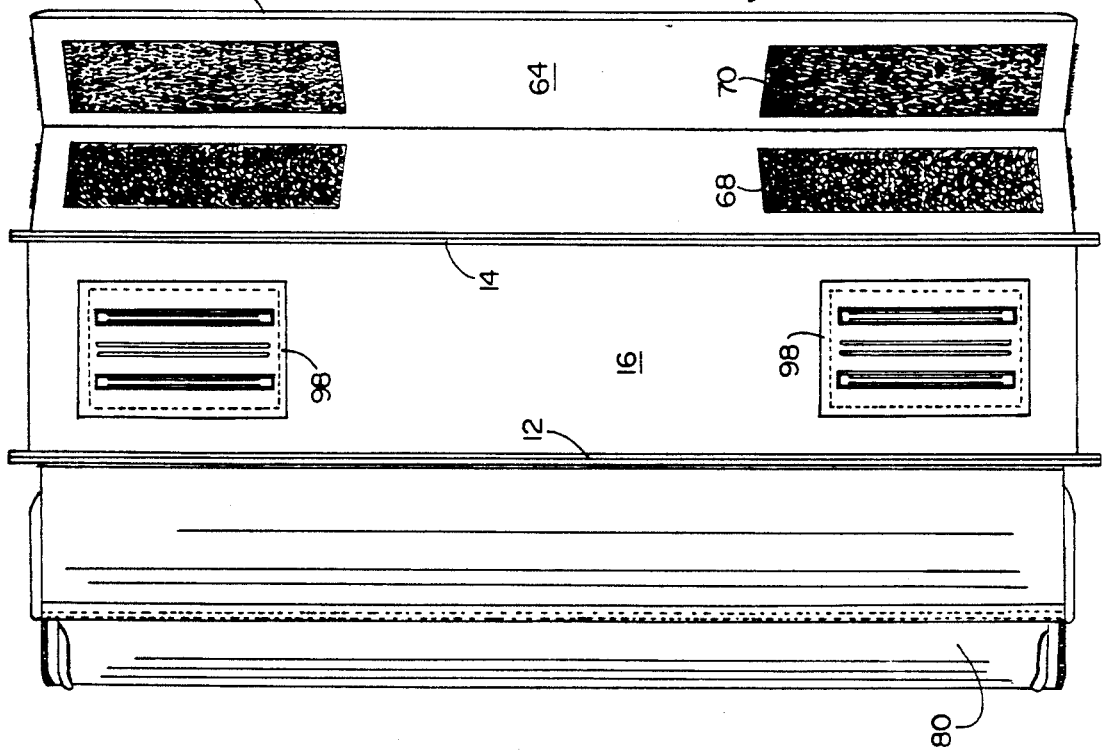
FIG. 5 is a bottom view in plan of the carrying case of the invention.

As shown in FIG. 5, bottom 16 of carrying case 10 may include feet 98 to ensure that the lowermost edges of front and rear walls 12 and 14 are not abraded by wear on floors and the like, preserving the neat and attractive appearance of the carrying case 10 of the invention.

The construction of carrying case 10 of the invention is generally conventional where not indicated differently above. In general the various compartments and panels are formed of suitable synthetic nylon fabrics or other durable materials, reinforced by stiffeners 18 and 20 in front and rear panels 12 and 14, and by stiffener 44 in horizontal portion 40a of top 40. The components of case 10 may be assembled by sewing, by adhesives, by both, or by other known techniques.

Inasmuch as the present invention is subject to many variations, modifications and changes in detail, it is intended that all subject matter discussed above or shown in the accompanying drawings be interpreted as illustrative only and not be taken in a limiting sense.

What is claimed is:

1. A carrying case for electronic equipment such as a laptop computer, comprising:
   a substantially flat elongated bottom adapted to rest on a flat floor or the like and having front and rear edges;

left and right side walls extending upwardly from respective ends of said flat bottom;

front and rear walls extending upwardly from lower edges juxtaposed to said front and rear edges, respectively, of said flat bottom, said front and rear wall each having an upper edge;

a top adapted to extend forwardly from said upper edge of said rear wall to meet said upper edge of said front wall, whereby said bottom, left and right side walls, front and rear walls, and top define a principal compartment for receiving a laptop computer; and a suspension member affixed to upper portions of said front and rear walls and depending downwardly therefrom within said principal compartment, said suspension member comprising a cradle for receiving said electronic equipment and resilient support means providing a shock-absorbing, weight-bearing connection between said cradle and said upper portions of said front and rear walls.

2. The carrying case of claim 1, wherein said cradle of said suspension member comprises a padded panel of a flexible fabric material.

3. The carrying case of claim 2, wherein said resilient support means comprises at least one panel of elastic fabric joined at opposite edges thereof to said cradle and to the upper portion of an inner surface of the corresponding one of said front and rear walls.

4. The carrying case of claim 1, wherein said front and rear walls are substantially planar and comprise planar stiffening and impact resistant members.

5. The carrying case of claim 4, wherein said stiffening and impact resistant members are encased by fabric.

6. The carrying case of claim 1, wherein said top is hinged to the upper edge of said rear wall and is releasably latched to said front wall.

7. The carrying case of claim 6, wherein said top comprises an upper section and a flap section, said flap section being flexibly joined to said upper section so as to depend over said front wall when said top is latched to said front wall.

8. The carrying case of claim 7, further comprising cooperating latch elements fixed to said flap section of said top and to said front wall.

9. The carrying case of claim 7, wherein said upper section of said top comprises a stiffening member, and further comprising means for carrying said carrying case affixed to said stiffening member.

10. The carrying case of claim 9, wherein said means for carrying comprises one or both of a handle and a shoulder strap.

11. The carrying case of claim 10, wherein said means for carrying comprises a shoulder strap including an anti-slip shoulder-engagement member.

12. The carrying case of claim 11, wherein said shoulder-engagement member is flexible, defines an arcuate shape when planar, and comprises first and second ends at which said member is joined to first and second end sections of said shoulder strap.

13. The carrying case of claim 1, further comprising one or more releasable strap members extending transversely between said upper edges of said front and rear walls to retain a laptop computer in said cradle.

14. The carrying case of claim 1, further comprising means defining a further compartment on the outer surface of at least one of said front and rear walls.

15. The carrying case of claim 14, wherein said means defining a further compartment comprises a panel of substantially similar extent as said rear wall, said panel being joined to said rear wall by means permitting said panel to be spaced away from said rear wall, and means releasably retaining said panel in juxtaposition to said rear wall.

16. The carrying case of claim 15, wherein said means for releasably retaining said panel in juxtaposition to said rear wall comprises cooperating strips of hook-and-loop fastener material.

17. The carrying case of claim 16, wherein said means joining said panel to said rear wall and permitting said panel to be spaced away from said rear wall comprises one or more V-creased fabric strip members forming side walls and a bottom of said further compartment.

18. The carrying case of claim 17, wherein said V-creased side and bottom members are of substantially continuous width, whereby said panel may be spaced away from while remaining substantially parallel to said rear wall.

19. The carrying case of claim 17, wherein said cooperating strips of hook and loop fastener material are disposed on opposed mating surfaces of said V-creased side and bottom members.

20. The carrying case of claim 15, further comprising a flap fixed to an upper portion of an outer surface of said rear wall for depending over and closing an opening at the top of said further compartment.

21. The carrying case of claim 20, further comprising cooperating strips of hook and loop material on said flap and said panel for releasably securing said flap over and closing the opening of said further compartment.

22. The carrying case of claim 21, wherein said cooperating strips of hook and loop material on said flap and said panel are orthogonal to one another.

23. The carrying case of claim 1, further comprising one or more additional compartments formed on the outer surface of said front wall.

24. The carrying case of claim 23, further comprising internal pockets in one or more of said one or more additional compartments.

* * * * *